US006523011B1

(12) United States Patent
Mihatsch

(10) Patent No.: US 6,523,011 B1
(45) Date of Patent: Feb. 18, 2003

(54) COMMUNICATION SYSTEM FOR TRANSMITTING ACCOUNTING INSTRUCTIONS

(75) Inventor: Peter Mihatsch, Sindelfingen (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/214,056

(22) PCT Filed: Jun. 23, 1997

(86) PCT No.: PCT/DE97/01341

§ 371 (c)(1),
(2), (4) Date: Jan. 13, 1999

(87) PCT Pub. No.: WO98/00802

PCT Pub. Date: Jan. 8, 1998

(30) Foreign Application Priority Data

Jun. 27, 1996 (DE) .......................................... 196 27 307
Jun. 27, 1996 (DE) .......................................... 196 27 308

(51) Int. Cl.⁷ .............................................. G06F 17/60
(52) U.S. Cl. ....................................................... 705/70
(58) Field of Search ................................ 370/338, 95.1; 705/40, 70; 235/380

(56) References Cited

U.S. PATENT DOCUMENTS 4,601,011 A * 7/1986 Grynberg .................... 235/380
5,574,979 A * 11/1996 West ........................ 370/95.1

(List continued on next page.)

FOREIGN PATENT DOCUMENTS

EP 0 446 500 * 9/1991
EP 0 662 665 * 7/1995

OTHER PUBLICATIONS

"Local competition: Cellular one & AT&T wireless services agree to provide wireless data service to the San Francisco bay area;" EDGE, pN/A, Jun. 17, 1996.*
"Home banking vendors sidestep past failures;" Bank Network News; pN/A, ISSN: 1063–4428, Apr. 12, 1992.*

(List continued on next page.)

Primary Examiner—V. Millin
Assistant Examiner—Forest O Thompson, Jr.
(74) Attorney, Agent, or Firm—Cohen, Pontani, Lieberman & Pavane

(57) ABSTRACT

A communication system for transmitting accounting instructions has central and decentralized devices. Accounting instructions input by individual users at the decentralized devices are checked for authenticity and retransmitted to the central devices to be processed. According to the invention, the communication system has at least virtually networked devices, means of an independent second communication system (2) with stationary devices (21, 22/1, 22/2) and portable communication transmitters (23) which communicate therewith in an encrypted manner. The stationary devices (21, 22/1, 22/2) of the second communication system (2) may be at least temporarily connected to the central devices (11) of the first communication system (1). Accounting instructions given by individual users with the portable communication transmitters (23) of the second communication system (2) can be previously authenticated in one of the central devices (11) of the first communication system. A previously authentified encrypted accounting code can be stored at least temporarily in the portable communication transmitters (23) of the second communication system (2); and the previously authentified, encrypted accounting codes can be transmitted to a decentralized device (12/1 to 12/3) of the first communication system independently of the first and second communication systems (1, 2) to conclude the accounting operation.

12 Claims, 2 Drawing Sheets

U.S. PATENT DOCUMENTS

Figure 1:
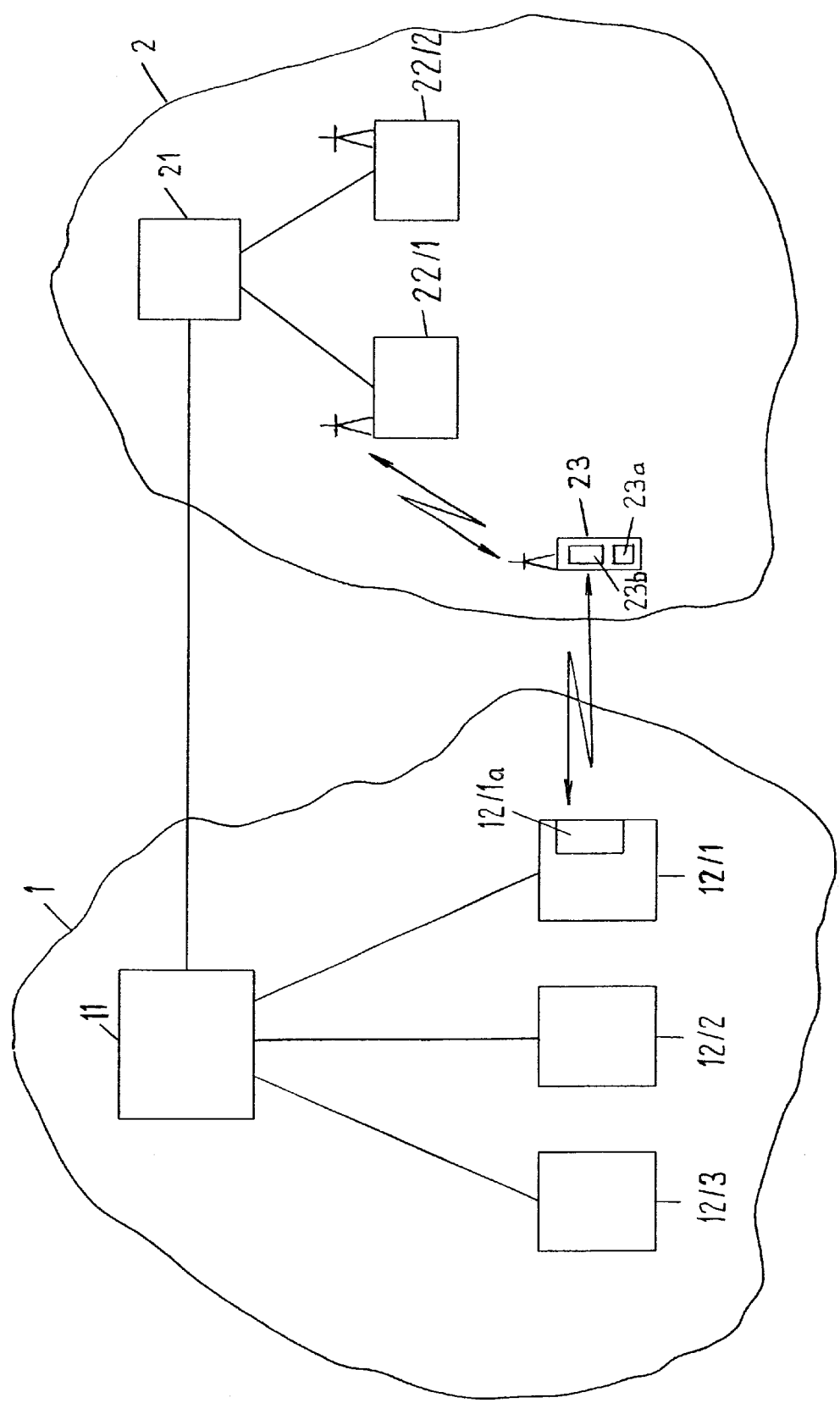

| | | | | | |
|---|---|---|---|---|---|
| 5,726,984 | A | * | 3/1998 | Kubler et al. | 370/338 |
| 5,790,536 | A | * | 8/1998 | Mahany et al. | 370/338 |
| 5,796,832 | A | * | 8/1998 | Kawan | 235/380 |
| 5,875,437 | A | * | 2/1999 | Atkins | 705/40 |
| 5,949,776 | A | * | 9/1999 | Mahany et al. | 370/338 |

OTHER PUBLICATIONS

"AT&T installs digital cellular data system in Peru;" PR Newswire; p919NY083, Sep. 19, 1995.*

Sullivan, R. Lee; "Fast Lane;" Forbes; vol. 154, Issue 1, Jul. 4, 1994.*

Messmer, Ellen; "Wireless technologies to pave way for private road;" Network World, vol. 10, Issue 6, Feb. 8, 1993.*

Wireless: Proxim introduces world's smallest, high–performance wireless LAN Design–in Module; EDGE: Work-Group Computing Report; May 5, 1997.*

Menefee, Craig; "Apple offers wireless mobile message system;" Newsbytes; Jan. 3, 1995.*

Wreden, Nick; "Getting into wireless with your feet on the ground;" V A R Business; Issue 1115, p. 80; Oct. 3, 1995.*

* cited by examiner

COMMUNICATION SYSTEM FOR TRANSMITTING ACCOUNTING INSTRUCTIONS

The invention relates to a communications system for transmitting accounting instructions, according to the preamble of Patent claim 1.

Such communications systems are known with clear prior use.

A multiplicity of prepayment smart cards, such as telephone cards, customer cards, credit cards etc. are in use for this purpose, which are suitable for being temporarily inserted into a remote device, which is physically separated from a central accounting device, in order to pay for goods or services. It is disadvantageous that these prepayment smart cards are normally suitable for a narrow specific purpose, for example telephone cards are suitable only for telephoning when using terminals of a single telephone organization, and can be used in conjunction with remote devices of varying convenience. Furthermore, obtaining such a prepayment smart card is normally accompanied by monetary loss. In addition, for liability reasons, such smart cards have limited maximum values, which limit their usability to a major extent.

Furthermore, a communications system for transmitting accounting instructions, so-called "homebanking", has become known in-which the user of this system uses a personal computer with a modem to transmit accounting instructions to a central accounting device, via a telephone link. The technical devices required for this purpose are transportable only to a limited extent. Furthermore, this method suffers from the lack of capability to make cash payments. In addition, the precautions for protection against unlegitimized access are, at least, incomplete.

The invention is thus based on the object of specifying a communications system of this generic type, which allows convenient access with the best-possible security against unlegitimized access, as well as wide acceptance.

According to the invention, this object is achieved in a first variant by the means in Patent claim 1. Advantageous refinements of the first variant of the invention are described in Patent claims 2 to 6.

The invention is in this case based on a communications system which is known per se for transmitting accounting instructions, which comprises central and remote devices which are at least virtually networked with one another, and in which case the user-specific accounting instructions which can be input at the remote devices are checked for their legitimacy and are passed on to central devices for processing.

The essence of the invention is that an independent second communications system is provided, which comprises fixed-position devices and portable communications terminals which communicate with these fixed-position devices in encrypted form. In this case, the fixed-position devices of the second communications system can at least temporarily be connected to the central devices of the communications system, for transmitting accounting instructions. The portable communications terminals of the second communications system can be used for initial legitimization of user-specific accounting instructions in one of the central devices of the communications system, for transmitting accounting instructions. The invention furthermore provides that an initially legitimized, encrypted accounting code can at least temporarily be stored in the portable communications terminal of the second communications system, and that the initially legitimized, encrypted accounting code can be transmitted, independently of the first and the second communications system for actual accounting purposes to a remote device of the first communications system.

An accounting instruction initiated by a user is input using the means of the portable communications terminal of the second communications system. To this end, the portable communications terminal is equipped with a keyboard and, preferably, with a display apparatus. The accounting instruction is transmitted within the second communications system, using the encryption which is inherent in the second communications system, to a fixed-position device of the second communications system, and is passed on to a central device of the communications system, for transmitting accounting instructions.

User access to the services of the second communications system is protected against unlegitimized access by a multi-stage identification process. To this end, the terminal number of the portable communications terminal, the user's subscriber number, which is stored on a replaceable module within the portable communications terminal, and the personal identification number of the user are interrogated by the fixed-position devices of the second communications system. This multi-stage identification process prevents unlegitimized access to the second communications system, when used correctly. The second communications system is preferably a mobile communications system based on the GSM Standard.

A high level of convenience is advantageously achieved with the best-possible security against unlegitimized access, since known portable communications terminals have such small volumes that they can always be carried on the person.

An additional positive effect may be regarded as being that accounting business can be carried out in addition using a single device carried on the person, which is in any case already widely used for the purpose of verbal and data communication.

According to the invention, this object is achieved in a second variant by the means in Patent claim 7. Advantageous refinements of the second variant of the invention are described in Patent claims 8 to 12.

The invention is in this case based on a communications system which is known per se for transmitting accounting instructions, which comprises central and remote devices which are at least virtually networked with one another, in which case the user-specific accounting instructions which can be input on the remote devices are checked for their legitimacy and are passed on to central devices for processing.

The essence of the invention is that an independent second communications system is provided, which comprises fixed-position devices and portable communications terminals which communicate with these fixed-position devices in encrypted form. In this case, the fixed-position devices of the second communications system can at least temporarily be connected to the central devices of the communications system, for transmitting accounting instructions. The portable communications terminals of the second communications system can be used, after legitimization to initiate user-specific accounting instructions in one of the remote devices of the communications system for transmitting accounting instructions. In this case, the user is legitimized during his access to the second communications system.

User access to the services of the second communications system is protected against unlegitimized access by a multi-stage identification process. To this end, the terminal number of the portable communications terminal, the user's subscriber number, which is stored on a replaceable module within the portable communications terminal, and the personal identification number of the user are interrogated by the fixed-position devices of the second communications system. This multi-stage identification process prevents unlegitimized access to the second communications system, when used correctly. The second communications system is preferably a mobile communications system based on the GSM Standard.

There is advantageously no need for any further legitimization.

The invention furthermore provides that initiated and legitimized accounting instructions can be transmitted as an accounting code, originating from the remote devices of the first communications system, via the portable communications terminal of the second communications system, at least to a fixed-position device of the second communications system. The accounting codes for actual accounting purposes can be transmitted from this fixed-position device to the central device of the first communications system.

In this case, there is advantageously no need for the central and remote devices of the first communications system to be networked.

An accounting instruction initiated by a user is input using the means of the portable communications terminal of the second communications system. The portable communications terminal is equipped with a keyboard and, preferably, with a display apparatus for this purpose. The accounting instruction is converted within the remote device of the of the [sic] communications system for transmitting accounting instructions into an accounting code, which is transmitted via devices of the second communications system in encrypted form.

The accounting codes can be settled in a fixed-position device and can be debited from the user together with the user-specific debit for using the services of the second communications system. In this case, it is regarded as advantageous that the user now receives only a single overall bill periodically for information and checking, both for the use of the services of the second communications system and for payment for goods and services to and from remote devices of the communications system for transmitting accounting instructions.

Furthermore, a high level of convenience is advantageously achieved with the best-possible security against unlegitimized access, since known portable communications terminals have such small volumes that they can always be carried on the person.

An additional positive effect may be regarded as being that accounting business can be carried out in addition using a single device carried on the person, which is in any case already widely used.for the purpose of verbal and data communication.

The invention is explained in more detail in the following text for both variants, with reference to in each case one exemplary embodiment and by means of FIGS. 1 and 2, including consideration of advantageous refinements.

Figure 2:
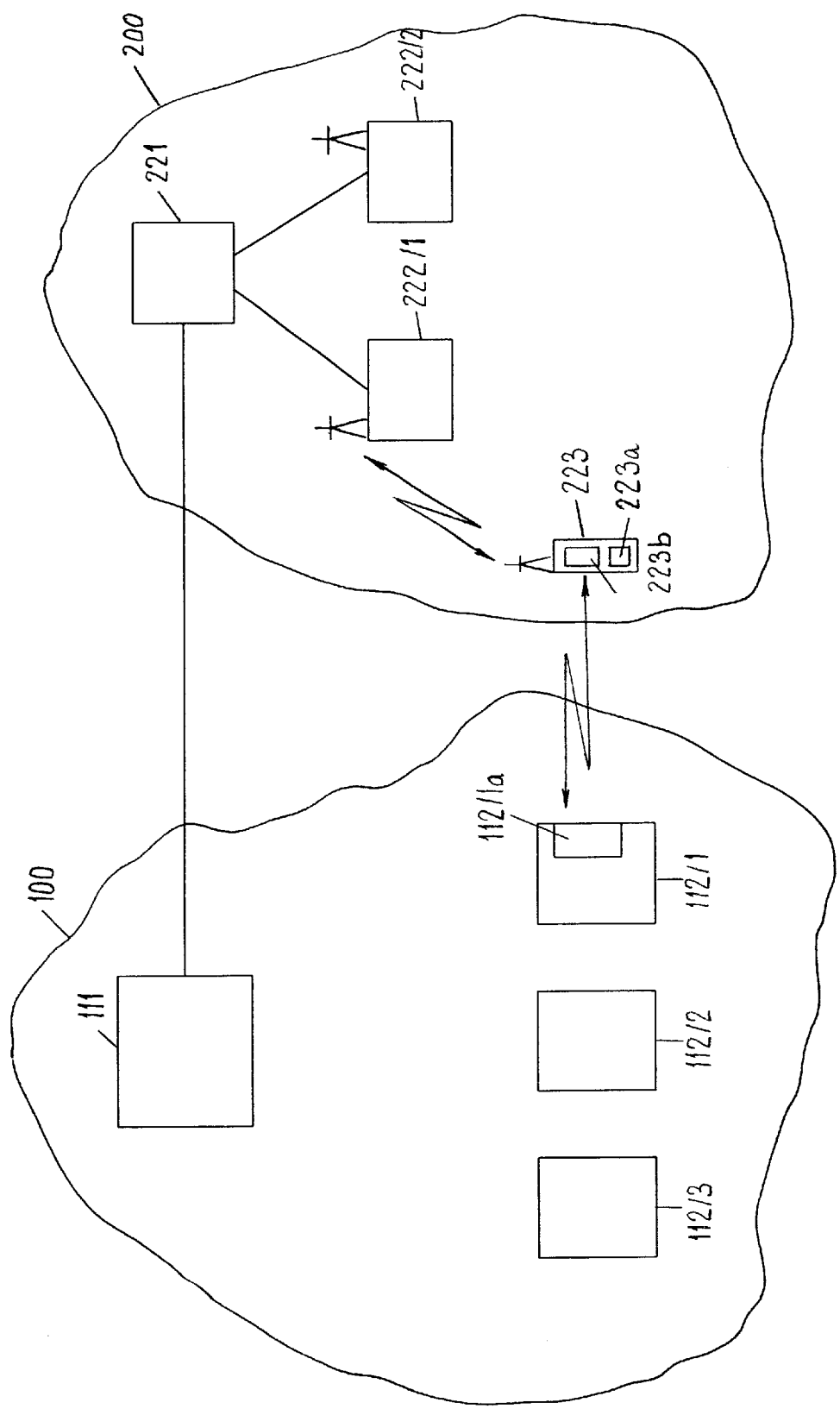

FIG. 1 is a block diagram showing a communications system according to an embodiment of the present invention; and FIG. 2 is a block diagram showing a communications system according to another embodiment of the present invention.

FIG. 1 shows a communications system 1 for transmitting accounting instructions, having a central device 11 and having three remote devices 12/1 to 12/3, which are networked with one another in such a manner that each remote device 12/1 to 12/3 is linked to the central device 11. This link may be permanently connected, or may be connected temporarily, on request.

Furthermore, a second-communications system 2 having fixed-position devices 21, 22/1 and 22/2 and portable communications terminals 23 is shown, this system being designed as a mobile communications system. In this case, the fixed-position devices 21, 22/1 and 22/2 are permanently linked to one another. A link between the portable communications terminal 23 and one of the fixed-position devices 22/1 and 22/2 is accordingly produced when required, this link being a radio link with encrypted data transmission.

The fixed-position device 21 of the communications system 2 is linked to the central device 11 of the communications system 1 for transmitting accounting instructions. This link may be permanently connected, or may be connected temporarily, on request.

A user-specific accounting instruction is input on the keyboard of the portable communications terminal 23 and is transmitted via the fixed position devices 22/1 and 21 of the mobile communications system 2 to the central device 11 of the communications system 1 for transmitting accounting instructions. If a user access precondition exists to the communications system 1 for transmitting accounting instructions, the received accounting instruction is legitimized in advance by the central device 11 and is transmitted as an initially legitimized accounting code via the fixed-position devices 21 and 22/1 of the mobile communications system to the portable communications terminal 23, and is at least temporarily buffer-stored in the portable communications terminal.

Since the legitimization.of the user has already been checked in a number of stages during access to the mobile communications system 2, there is advantageously no need for any additional legitimization of the user for the purposes of the central device 11 of the communications system 1 for transmitting accounting instructions. In this case, it may be regarded as being a further advantage that the number of access and identification keys to be remembered by the user is reduced, thus reducing risk of confusion and incorrect identification. This feature is particularly important with regard to the tightly limited number of access attempts used as the basis of security in conventional systems.

For actually ordering goods or services, the initially legitimized, encrypted accounting code, which is buffer-stored in the portable communications terminal 23, is transmitted, independently of the first and the second communications system 1 and 2 for actual accounting purposes, to a remote device 12/1 of the communications system 1 for transmitting accounting instructions.

For this purpose, the invention provides that the portable communications terminal 23 of the mobile communications system and the remote device 12/1 of the communications system 1 for transmitting accounting instructions can be connected to one another via a wire-free, short-range communications arrangement, in which case the portable communications terminal 23 is equipped at least with transmitting means, and the remote device 12/1 is equipped at least with receiving means.

In an advantageous refinement of the invention, this wire-free, short-range communications arrangement is represented by an infrared link. The technical means required to do this are distinguished in an advantageous manner by very small volumes and very low supply requirements, so that they can advantageously be integrated in known portable communications terminals.

In an alternative refinement of the wire-free, short-range communications arrangement, the invention provides for this arrangement to be designed as an ultrasound link. The technical means required for this purpose have the same advantageous characteristics as the infrared link.

A further refinement of the invention provides for the initially legitimized, encrypted accounting code to be encrypted in accordance with the algorithms in the traffic between the central and remote devices 11 and 12/1 to 12/3.

The accounting code which is transmitted to the remote device 12/1 can advantageously be processed directly by the remote device 12/1, as if it had been transmitted by the central, device 11 of the same communications system 1.

In a more far-reaching refinement, the invention provides for the initially legitimized, encrypted accounting code to be transmitted in encrypted form in accordance with the algorithms in the traffic between the fixed-position devices 21, 22/1 and 22/2 and the portable communications terminals 23 of the mobile communications system 2, which communicate with these fixed-position devices 21, 22/1 and 22/2 in encrypted form. In other words, the.initially legitimized accounting code which has already been encrypted, in accordance with the communications system 1, using means in said communications system 1 for transmitting accounting instructions, while its transmission is encrypted yet again, that is to say superimposed, within the mobile communications system 2.

This double encryption advantageously makes unlegitimized access to initially legitimized accounting codes at least considerably more difficult, thus making wide acceptance possible on the basis of the far-reaching security precautions.

FIG. 2 shows a communications system 100 for transmitting accounting instructions, having a central device 111 and three remote devices 112/1 to 112/3.

Furthermore, a second communications system 200 having fixed-position devices 221, 222/1 and 222/2 and portable communications terminals 223 is shown, this system being designed as a mobile communications system. In this case, the fixed-position devices 221, 222/1 and 222/2 are permanently linked to one another. A link between the portable communications terminal 223 and one of the fixed-position devices 222/1 and 222/2 is accordingly produced when required, this link being a radio link with encrypted data transmission.

The fixed-position device 221 of the second communications system 200 is linked to the central device 111 of the communications-system 100 for transmitting accounting codes. This link may be permanently connected, or may be connected temporarily, on request.

A user-specific accounting instruction is input on the keyboard of the portable communications terminal 223 and is transmitted to the remote device 112/1 of the communications system 100 for transmitting accounting instructions, in which case-the satisfaction of the access preconditions to the second communications system 200 is the user-specific legitimization for the initiation of accounting instructions in the first communications system 100.

Since the legitimization of the user has already been checked in a number of stages during access to the mobile communications system 200, there is advantageously no need for any additional legitimization of the user for the purposes of the central device 111 of the communications system 100 for transmitting accounting instructions. In this case, it may be regarded as being a further advantage that the number of access and identification keys to be remembered by the user is reduced, thus reducing risk of confusion and incorrect identification. This feature is particularly important with regard to the tightly limited number of access attempts used as the basis of security in conventional systems.

The accounting instruction is converted, in one remote device 112/1 of the communications system 100 for transmitting accounting instructions, into an accounting code which, originating from the remote devices 112/1 of the first communications system 100, is transmitted via the portable communications terminal 223 of the second communications system 200 at least to a fixed-position device 221 of the second communications system 200. Acknowledgement by the fixed-position device 221 that it has received the accounting code is sufficient to actually order goods or services.

In this case, the invention provides that the portable communications terminal 223 of the mobile communications system, and the remote device 112/1 of the communications system 100 for transmitting accounting instructions, can be connected to one another via a wire-free, short-range communications arrangement, in which case the portable communications terminal 223 and the remote device 112/1 are, each equipped with transmitting and receiving means.

In an advantageous refinement of the invention, this wire-free, short-range communications arrangement is represented by an infrared link. The technical means required to do this are distinguished in an advantageous manner by very small volumes and very low supply requirements, so that they can advantageously be integrated in known portable communications terminals.

In an alternative refinement of the wire-free, short-range communications arrangement, the invention provides for this arrangement to be designed as an ultrasound link. The technical means required for this purpose have the same advantageous characteristics as the infrared link.

A more far-reaching refinement of the invention provides for the legitimized accounting code to be transmitted in encrypted form in accordance with the algorithms in the traffic between the fixed-position devices 221, 222/1 and 222/2 and the portable communications terminals 223 of the mobile communications system 200 which communicate with these fixed-position devices 221, 222/1 and 222/2 in encrypted form, thus allowing wide acceptance based on the far-reaching safety precautions.

The invention furthermore provides that the fixed-position devices 221, 222/1, 222/2 of the second communications system 200 can be split into central fixed-position devices 221 and remote fixed-position devices 222/1, 222/2, and that the central fixed-position devices 221 can be equipped with means for settlement storage of accounting codes. In mobile communications systems which can preferably be used, these means for settlement storage of accounting codes can advantageously be integrated in the already implemented means for user-specific debiting for the use of the services of the mobile-communications system.

What is claimed is:

1. A communication system for transmitting accounting information, comprising:

a first communications sub-system having a central device and a remote device; and a second communications sub-system having a fixed-position device connectable with said central device and a portable communications terminal operatively connected to said fixed-position device for communicating with said fixed-position device via a second encrypting algorithm, said portable communications device comprising means for receiving an accounting instruction and legitimizing said accounting instruction with said central device of said first communication sub-system via said fixed-position device, said central device comprising means for legitimizing said accounting instruction and transmitting an encrypted legitimized accounting code to said portable communications terminal via said fixed-position device, and said portable communication device comprising means for storing said encrypted legitimized accounting code and means for transmitting said legitimized encrypted accounting code to said remote device for implementing said accounting instruction.

2. The communications system of claim 1, wherein said portable communication terminal of said second communications sub-system is operatively connectable to said remote device of said first communications sub-system for transmitting said legitimized encrypted accounting code to said remote device via a wire-free, short-range communications arrangement.

3. The communications system of claim 2, wherein said wire-free, short-range communications arrangement comprises an infrared link.

4. The communications system of claim 2, wherein said wire-free, short-range communications arrangement comprises an ultrasound link.

5. The communications system of claim 1, wherein said first communication sub-system comprises a first encrypting algorithm for encrypting communications between said central device and said remote device and said first encrypting algorithm matches said second encrypting algorithm.

6. The communications system of claim 1, wherein said fixed-position device comprises means for transmitting said legitimized encrypted accounting code in accordance with said second encrypting algorithm.

7. A communication system for transmitting accounting information, comprising:

a first communications sub-system having a central device and a remote device; and a second communications sub-system having a fixed-position device connectable with said central device and a portable communications terminal operatively connected to said fixed-position device for communicating with said fixed-position device via a second encrypting algorithm, said portable communications device comprising means for receiving an accounting instruction and transmitting said accounting instruction to said remote device, said remote device having means for transmitting a user specific accounting code to said fixed-position device via said portable communication device in response to said accounting instruction, said fixed-position device comprising means for legitimizing said accounting code and transmitting an acknowledgement to said remote device via said portable communications terminal and an encrypted legitimized accounting code to said central device for implementing said accounting instruction.

8. The communications system according to claim 7, wherein said portable communications terminal of the second communications sub-system and said remote device of said first communications sub-system are connected to one another via a wire-free, short-range communications arrangement, and each said portable communications terminal and said remote device comprise means for transmitting and receiving.

9. The communications system of claim 8, wherein said wire-free, short range communications arrangement comprises an infrared link.

10. The communications system of claim 8, wherein said wire-free, short-range communications arrangement comprises an ultrasound link.

11. The communications system of claim 7, wherein said first communication sub-system comprises a first encrypting algorithm for encrypting communications between said central device and said fixed-position devices and said first encrypting algorithm matches said second encrypting algorithm.

12. The communications system of claim 7, wherein said fixed-position device comprises a central fixed-position device and a remote fixed-position devices and said central fixed-position device comprises means for settlement storage of accounting codes.

* * * * *